United States Patent
Fletchall et al.

(10) Patent No.: US 8,751,316 B1
(45) Date of Patent: Jun. 10, 2014

(54) CUSTOMER-CONTROLLED POINT-OF-SALE ON A MOBILE DEVICE

(75) Inventors: Jason Allen Fletchall, Bloomington, IN (US); Dillon Campbell Compton, Malvern, PA (US); Kristina Lam Thai, Riverside, CA (US); Andrew Trung Huynh, Agoura Hills, CA (US); Michael Harry Lintz, Needham, MA (US)

(73) Assignee: Intuit Inc., Mountain View, CA (US)

( * ) Notice: Subject to any disclaimer, the term of this patent is extended or adjusted under 35 U.S.C. 154(b) by 652 days.

(21) Appl. No.: 12/701,462

(22) Filed: Feb. 5, 2010

(51) Int. Cl.
*G06Q 20/00* (2012.01)

(52) U.S. Cl.
USPC .................................. 705/20; 705/21; 705/16

(58) Field of Classification Search
None
See application file for complete search history.

(56) References Cited

U.S. PATENT DOCUMENTS

2010/0082445 A1* 4/2010 Hodge et al. ..................... 705/21
2011/0145093 A1* 6/2011 Paradise et al. ............ 705/26.41

OTHER PUBLICATIONS

Cooper, Caroline, "Intel Developing New Retail Self-Checkout Terminal, Information Kiosk," http://www.selfservice.org, Sep. 4, 2009, 1 page.
Szretter, June, "E.E.S. Demonstrating iPhone POS/OE 4 Service at Outdoor Retailer 2008," http://prmac.com, Jan. 23, 2008, 2 pages.
PCMag.com, "Mobile POS for Your iPhone: Ring It Up," http://blogs.pcmag.com, Mar. 9, 2009, 1 page.
New West Technologies, "Mobile POS Solutions," http://www.newestech.com, Aug. 22, 2008, 2 pages.

* cited by examiner

*Primary Examiner* — Ramsey Refai
(74) *Attorney, Agent, or Firm* — Osha Liang LLP (57) ABSTRACT

A method to purchase a product by a user in a retail store. The method steps include obtaining a reference of the retail store using a mobile device of the user, accessing a product database for the retail store based on the reference of the retail store, obtaining, in the retail store, a product identifier of the product using the mobile device, retrieving product information from the product database based on the product identifier, and displaying the product information on the mobile device.

24 Claims, 6 Drawing Sheets

CUSTOMER-CONTROLLED POINT-OF-SALE ON A MOBILE DEVICE

BACKGROUND

The most time consuming and least enjoyable aspect of shopping is the checkout process. Customers spend significant amounts of time waiting in line and having their orders processed by store employees. Further, merchants spend significant amounts of money to install traditional Point-Of-Sale (POS) systems and employ individuals to operate them.

Self-Checkout POS systems (e.g., self-checkout terminals) are widely used by major retailers in the United States. Typically, one employee can monitor 4-8 self-checkout terminals. However, the self-checkout POS systems are similar to traditional POS systems as they are full-sized, stationary POS terminals that require installation and management by the retailer.

SUMMARY

In general, in one aspect, the invention relates to a method to purchase a product by a user in a retail store. The method steps include obtaining a reference of the retail store using a mobile device of the user, accessing a product database for the retail store based on the reference of the retail store, obtaining, in the retail store, a product identifier of the product using the mobile device, retrieving product information from the product database based on the product identifier; and displaying the product information on the mobile device, In general, in one aspect, the invention relates to a system for purchasing a product by a user in a retail store. The system includes a product database accessible based on a reference of the retail store to store product information of the product indexed by a product identifier of the product and provide the product information based on the product identifier of the product. In addition, the system includes a mobile device of the user that includes a product scanner configured to obtain, in the retail store, the product identifier of the product and a mobile point-of-sale (POS) application that is configured to obtain the reference of the retail store, cause the product scanner to obtain the product identifier of the product, access the product database based on the reference of the retail store, retrieve product information from the product database based on the product identifier, and display the product information.

In general, in one aspect, the invention relates to a computer readable medium, embodying instructions executable by the computer to perform method steps to purchase a product by a user in a retail store. The instructions include functionality for obtaining a reference of the retail store using a mobile device of the user, accessing a product database for the retail store based on the reference of the retail store, obtaining, in the retail store, a product identifier of the product using the mobile device, retrieving product information from the product database based on the product identifier, and displaying the product information on the mobile device.

Other aspects of the invention will be apparent from the following description and the appended claims.

DETAILED DESCRIPTION

Specific embodiments of the invention will now be described in detail with reference to the accompanying Figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a system and method of using a customer's mobile device to purchase products from a physical store (i.e., a brick and mortar store), while the customer is in the store and without direct interaction with the store staff. In one or more embodiments of the invention, this mobile device includes one or more applications for interfacing with the merchant's product inventory, for providing consumer-controlled point-of-sale (POS) services to the consumer, and for providing automatic inventory updates to the merchant. Accordingly, the user experience may be enhanced and the operating expenses incurred by the merchant may be reduced.

Figure 1:
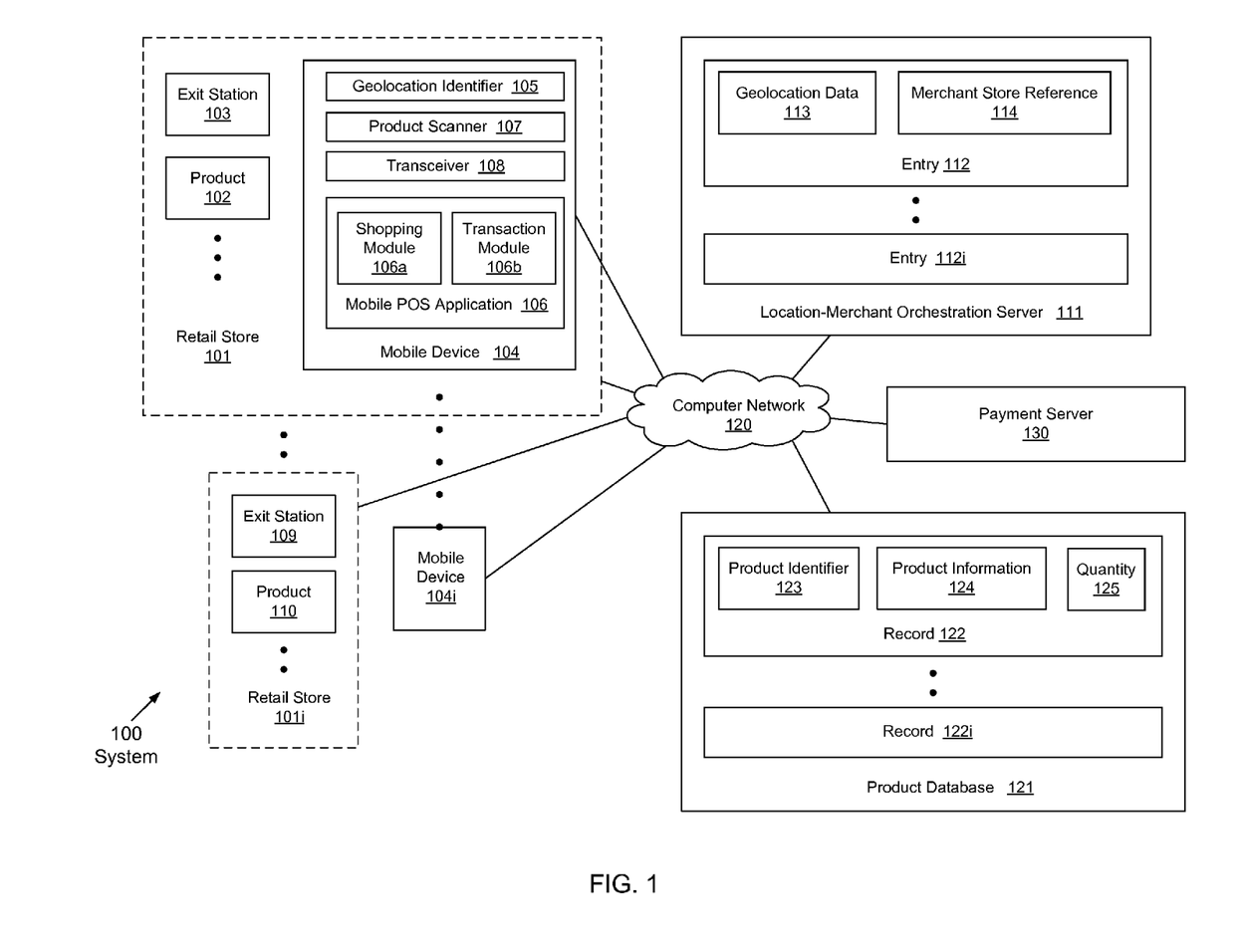
FIG. 1 depicts a system in accordance with one or more embodiments of the invention.

FIG. 1 depicts a system (100) in accordance with one or more embodiments of the invention. The modules shown in FIG. 1 may be omitted, repeated, and/or substituted among different embodiments of the invention. Accordingly, embodiments of the invention should not be considered limited to the specific arrangements of modules shown in FIG. 1.

As shown in FIG. 1, the system (100) includes one or more retail stores (101, 101i), one or more mobile devices (104, 104i), a location-merchant orchestration server (111), a product database (121), and a payment server (130). In one or more embodiments of the invention, the aforementioned components of the system (100) are coupled via computer network (120). In particular, the components of the system (100) communicate with each other using network communication protocols known to those skilled in the art. Although a single computer network (120) is shown in FIG. 1, those skilled in the art will recognize that multiple networks with wired and/or wireless segments, point-to-point connections, network gateways, or other suitable coupling configurations may also be used. For example, the computer network (120) may include the Internet, enterprise Intranet, mobile phone service provider network, the public switched telephone network (PSTN), etc.

In one or more embodiments of the invention, the retail stores (101, 101i) are brick and mortar stores having physical addresses/locations (e.g., 123 Park Ave., New York, N.Y.) and occupying multiple square feet of real estate on one or more floors. The retail stores (101, 101i) sell one or more products (102, 110) and have one or more exit stations (103, 109) (discussed below). Although not specifically shown, the retail stores (101, 101i) are operated by one or more merchants. Accordingly, one or more of the products (102, 110) are tagged (e.g., using a barcode, a RFID tag, etc.) with a product ID defined by the particular merchant.

Although a specific number of each of the aforementioned components of the system (100) are shown in FIG. 1, any number of such components may be included in the system (100) without deviating from the spirit of the invention. For example, multiple location-merchant orchestration servers, product databases, and/or multiple payment servers may be included in the system (100). Further, any number of the mobile devices (104, 104i) may be used by any number of users to purchase any number of products (102, 110) in any number of retail stores (101, 101i). In this context, the users of the mobile devices (104, 104i) are considered users of the system (100). In other words, the users of the mobile devices (104, 104i) are the customers, consumers, buyers, shoppers, etc. of the retail stores (101, 101i).

In one or more embodiments of the invention, the product database (121) stores inventory and product information (e.g., pricing) mapped to product identifiers (e.g. UPC, RFID, etc.) for a particular merchant. An example of such a database is Quickbooks® (a registered trademark of Intuit, Inc., Mountain View, Calif.). Each record (122, 122i) of the product database (121) corresponds to a retail store (101, 101i). Specifically, each record corresponds to a product (e.g., products (102), product (110)) available for sale at the retail store. The record (122) includes: (i) a product identifier (123) for the product; (ii) a quantity (125) of the product available for sale (i.e., the number of units available for sale); and (iii) product information (124) for the product. The record (122i) includes similar components.

In one or more embodiments of the invention, the product identifier (123) is a universal product code (UPC), a radio frequency identification (RFID), or another identifier known in the art. For example, the product identifier (123) may be a numeric value or an alpha-numeric value attached to the product (102) via a barcode, a RFID tag, or other ID tag. In one or more embodiments, the product identifier (123) is an image of a barcode, a RFID tag, or other ID tag while the product database (121) is searchable based on image search functionalities.

In one or more embodiments of the invention, the product information (124) includes a sale price of the product and an additional description of the product (e.g., features, specifications, promotion discount, etc.). The merchant may update the product information (124) from time to time to reflect price changes of the product.

In one or more embodiments of the invention, the product database (121) is used for multiple retail stores (101, 101i) operated by the same merchant. Alternatively, different portions of the product database (121) are used by different merchants. As yet another alternative, each retail store has its own product database (121).

In one or more embodiments of the invention, the product database (121) is hosted on a merchant server (not shown). Alternatively, the product database (121) is maintained by a third party operator and located on a server (not shown) of the third party operator. A merchant may have exclusive access via a secure channel to a portion of the product database (121) corresponding to the products offered for sale by the merchant.

In one or more embodiments of the invention, the content of the product database (121) is accessible by the mobile devices (104, 104i). Specifically, when a mobile device supplies a product identifier to the product database (121), the product information linked to the product identifier will be retrieved by the product database (121) and returned to the mobile device. For example, if the mobile device (104i) provides the product identifier (123) to the product database (121), the product database (121) will respond to the mobile device (104i) with the product information (124). More details regarding the use of the mobile devices (e.g., 104, 104i) and the product database (121) for making purchases are described below.

In one or more embodiments of the invention, the location-merchant orchestration server (111) includes one or more entries (112, 112i). The entry (112) includes: (i) geographical data (113) for a retail store (e.g., retail store (101), retail store (101i)); and (ii) a merchant store reference (114) for the retail store. The entry (112i) includes similar components. The geographical data (113) comprises a location (e.g., GPS coordinates) corresponding to the retail store. The merchant store reference (114) identifies (e.g., using a pointer, a link, IP address, etc.) a product inventory database (e.g., product database (121)) for the retail store.

In one or more embodiments of the invention, the location-merchant orchestration server (111) is part of a web service accessible by the mobile devices (104, 104i). Accordingly, when a mobile device sends a location (e.g., GPS coordinates) of a retail store to the web service, the web service returns a pointer to the corresponding merchant's product inventory database. Generally speaking, as retail stores are added to the system (100), an entry is added to the location-merchant orchestration server (111).

In one or more embodiments, the location-merchant orchestration server (111) is operated by a third party having a business agreement with the retail stores (101, 101i). Alternatively, the location-merchant orchestration server (111) is operated by a merchant operating one or more of the retail stores (101, 101i). In such embodiments, the merchant determines the content of the location-merchant orchestration server (111) and therefore determines which of the one or more of the retail stores (101, 101i) participates in the system (100).

In one or more embodiments of the invention, the payment server (130) is configured to receive payment information and execute payments (i.e., sales transactions) for the products (102, 110) in the retail stores (101, 101i). The payment server (130) is configured to execute sale transactions using a variety of payment methods including credit card and bank-based payments such as direct debit and bank transfer. In one or more embodiments of the invention, the payment server (130) is operated by a third-party separate from the merchant(s) of the retail stores (101, 101i). Example third party payment services include GoPayment® (a registered trademark of Intuit, Inc., Mountain View, Calif.) and PayPal® (a registered trademark of PayPal, Inc., San Jose, Calif.). Alternatively, the payment server (130) is operated by a merchant operating one or more of the retail stores (101, 101i).

In one or embodiments of the invention, following a sales transaction between a mobile device (e.g., mobile device (104)) and a retail store (e.g., retail store (101)), the payment server (130) is configured to send an electronic receipt (not shown) to the mobile device and/or the exit station(s) (e.g., exit station (103)) of the retail store. The electronic receipt may list the item(s) sold and the sale price of each item sold. The electronic receipt may also include a unique identifier (discussed below) which may be stored/displayed as a barcode.

In one or more embodiments of the invention, following a sales transaction between a mobile device and a retail store, the payment server (130) is configured to notify a product database regarding the sales transaction. In response to the notification, the record(s) within the product database corresponding to the sold item(s) are updated to reflect the change in inventory at the retail store. For example, assume the quantity (125) is the number of units of product (102) available for sale at the retail store (101). Further, assume a user of the mobile device (104) purchases 2 units of product (102). Following the sales transaction, the payment server (130) will notify the product database (121) regarding the sales transaction. In response to the notification, the quantity (125) will be decremented by 2 to reflect the change in inventory at the retail store (101). More details regarding the use of mobile devices (104, 104i) and the payment server (130) for making purchases are discussed below.

In one or more embodiments of the invention, the exit stations (103, 109) are computer terminals positioned at or near the exits of the retail stores (101, 101i). The exit stations (103, 109) are used to verify that a product leaving the perimeter of the retail store has been purchased. The exit stations (103, 109) may include one or more display screens, a printer, one or more audio speakers, a keyboard, a microphone, a camera, and one or more scanners (e.g., barcode scanner, radio frequency scanner, etc.).

In one or more embodiments of the invention, an exit station within a retail store (e.g., exit station (103) in retail store (101)) maintains copies of all electronic receipts for all sale transactions within the retail store. These copies may be stored locally at the exit terminals (103, 109) and may be provided to the exit stations (103, 109) by the payment server (130). Alternatively, these copies may be stored at the payment server (130) and made accessible to the exit stations (103, 109). When a mobile device is within a pre-determined range of an exit station (103, 109) (e.g., the user of the mobile device is walking near or past the exit station (103, 109)), the exit station (103, 109) may receive an electronic sales receipt or a code identifying an electronic sales receipt from the mobile device. The electronic sales receipt may be transmitted to the exit stations (103, 109) using any wireless communications technology including Bluetooth protocol, radio waves, infrared, etc. The exit station may then compare the received electronic sales receipt or the received code identifying the electronic sales receipt with the electronic sales receipts provided by the payment server (130). If a match is found, this confirms the mobile device initiated a successful sales transaction.

In one or more embodiments, the exit station (103) is further configured to display the received electronic sales receipt and/or the results of a matching attempt for inspection by an employee of the retail store (101, 101i).

In one or more embodiments of the invention, the mobile device (104) is a mobile phone, a smart phone, a laptop computer, or a personal digital assistant (PDA), or any other device that can connect with the computer network (120). The mobile device (104) includes a geolocation identifier (105), a product scanner (107), a transceiver (108), and a mobile POS application (106) having a shopping module (106a) and a transaction module (106b). The mobile device (104i) includes similar components.

As shown in FIG. 1, the mobile device (104) is within the retail store (101) to indicate that a user of the mobile device (104) has entered the retail store (101), for example to browse and/or purchase various products sold by the retail store (101).

In one or more embodiments of the invention, the mobile device (104) includes the transceiver (108), which is configured to communicate with the location-merchant orchestration sever (111), the product database (121), the payment server (130), and/or other components of the system (100) via the computer network (120). In one or more embodiments, the mobile device (104) uses the transceiver (108) to access a wireless (e.g., WiFi, 3G, 4G, EDGE, etc.) network, which is a part of the computer network (120) maintained by the retail store (101). In addition, the mobile phone may also be equipped with various functionalities described below.

In one or more embodiments of the invention, the mobile device (104) includes the geolocation identifier (e.g., a global positioning device (GPS)), which is configured to obtain geolocation data (e.g., GPS coordinates) representing a location of the mobile device (104). Accordingly, the geolocation data obtained by the geolocation identifier (105) may represent a location of the retail store (101) when the mobile device (104) is carried by the user into the retail store (101) to browse and/or purchase products (102, etc.).

In one or more embodiments of the invention, the mobile device (104) includes the product scanner (107) (e.g., an optical scanner, a radio frequency scanner, etc.), which is configured to read product identifiers from products (102, 110) in the retail stores. For example, when the mobile device (104) is in the retail store (101), the product scanner (107) may obtain the product identifier (123) (e.g., a universal product code (UPC), radio frequency identification (RFID), etc.) by scanning a product ID (e.g., a barcode, a RFID tag, etc., not shown) attached to the product (102).

In one or more embodiments of the invention, the mobile device (104) includes the mobile POS application (106), which is a software application installed on the mobile device (104) for making purchases at the retail stores (101, 101i). In particular, the mobile POS application (106) provides the user interface as well as the coordination with other components in the system (100) to enable the user-controlled POS services described below.

In one or more embodiments of the invention, the mobile POS application (106) is provided by a merchant operating one or more of the retail stores (101, 101i). In one or more embodiments, the mobile POS application (106) is provided by a third party operator of the location-merchant orchestration server (111). In one or more embodiments, the mobile POS application (106) is configured to access the functionalities of various components (e.g., the geolocation identifier (105), the product scanner (107), the transceiver (108), etc.) of the mobile device (104) using an application programming interface (API).

In one or more embodiments of the invention, the geolocation identifier (105) continuously obtains the geolocation data (not shown) representing a location of the mobile device (104). For example, such operation may be initiated based on the user (not shown) activating a built-in command of the mobile device (104), such as a command to turn on a GPS function of a smart phone.

In one or more embodiments of the invention, the mobile POS application (106) is configured to cause the geolocation identifier (105) to obtain the geolocation data. For example, the mobile POS application (106) may use an API (not shown) obtain function of the mobile device (104) to cause the geolocation identifier (105) to obtain the geolocation data (not shown).

In one or more embodiments of the invention, the mobile POS application (106) is configured to cause the geolocation identifier (105) to obtain the geolocation data responsive to receiving an obtain command from the user. For example, the user (not shown) may turn on the mobile POS application (106) and activate such obtain command when entering the retail store (101). Accordingly, the obtained geolocation data represents a location of the retail store (101). In another example, such obtain command is pre-programmed to take effect when the mobile POS application (106) is turned on, for example by the user when entering the retail store (101).

In one or more embodiments of the invention, the mobile POS application (106) is configured to cause the geolocation identifier (105) to obtain the geolocation data responsive to receiving a signal from the retail store (101). In such embodiments, the retail store (101) is configured to broadcast a signal (e.g., wireless signal) within a pre-determined range of the retail store (101). Accordingly, the mobile device (104) is configured to receive such signal (e.g., using the transceiver (108)) when brought within the pre-determined range as the user enters the retail store (101). In one or more embodiments of the invention, the mobile POS application (106) uses an API detect function of the mobile device (104) to detect such signal and cause the geolocation identifier (105) to obtain the geolocation data. Accordingly, the obtained geolocation data (not shown) represents a location of the retail store (101).

In one or more embodiments of the invention, the mobile POS application (106) is configured to send the geolocation data representing the location of the retail store (101) to the location-merchant orchestration server (111) to obtain a merchant store reference (e.g., 114) of the retail store (101). For example, if the geolocation data (representing the location of the retail store (101)) matches the geolocation data (113), the corresponding merchant store reference (114) in the entry (122) is returned to the mobile POS application (104). As discussed above, the merchant store reference (e.g., 114) of the retail stores (101, 101i) is used to access a product database (121) for the retail stores (101, 101i). More details regarding of the use of the product database (121) to purchase products are described later.

In one or more embodiments of the invention, the mobile POS application (106) is configured to use an application programming interface (API) (not shown) send function of the mobile device (104) to access the transceiver (108) for sending the geolocation data. As described earlier, the geolocation data may be obtained continuously, obtained responsive to a user command, or obtained responsive to a signal received from the retail store (101). In one or more embodiments, the mobile POS application (106) is configured to send the obtained geolocation data (not shown) responsive to receiving a send command from the user (not shown). In other words, although the mobile POS application (106) may be activated to obtain the geolocation data when entering the retail store (101), the geolocation data may not be transmitted until some future time (e.g., after browsing products for sale at the retail store) when the user activates a send command. In one or more embodiments of the invention, the obtain command and the send command are combined into a single command and pre-programmed to take effect when the mobile POS application (106) is turned on.

In one or more embodiments of the invention, the retail store (101) broadcasts a signal having the merchant store reference (114) within a pre-determined range of the retail store (101). For example, the broadcasted signal may be based on WiFi and/or Internet based push technology. In such embodiments, the mobile device (104) is configured to receive the signal (e.g., via the transceiver) and retrieve the merchant store reference (114) directly without accessing the location-merchant orchestration server (111). In addition, in such embodiments, it might not be necessary for the mobile device (104) to have the geolocation identifier (105) and for the system (100) to have the location-merchant orchestration server (111).

In one or more embodiments of the invention, the mobile POS application (106) includes the shopping module (106a), which is configured to assist the user of the mobile device (104) in making purchases in the retail store (101) by interacting directly with product inventory of the retail store (101). Specifically, the shopping module (106a) is configured to cause the product scanner (107) to obtain a product identifier of a product (e.g., product (102)), access the product database (121) for the retail store (101) to retrieve product information (124) regarding the products (102), and to display the product information (124) on a display screen of the mobile device (104) (e.g., within a virtual shopping cart).

For example, the user of the mobile device (104) may become interested in the product (102) when browsing isles (not shown) of the retail store (101) and decide to review product information of the product (102). In one or more embodiments of the invention, the user activates a scan command of the mobile POS application (106) while orienting the product scanner (107) of the mobile device (104) toward a product ID (e.g., barcode, RFID tag, etc.) attached to the product (102). In one or more embodiments, the shopping module (106a) of the mobile POS application (106) accesses the product scanner (107) using an API scan function of the mobile device (104) to initiate a scan and obtain a result of the scan. Accordingly, the product identifier (e.g., UPC, RFID, etc.) of the product (102) is obtained by the product scanner (107) and returned to the shopping module (106a) of the mobile POS application (106).

In one or more embodiments of the invention, the user activates a built-in camera of the mobile device (104) to take a picture of a product ID (e.g., barcode, RFID tag, etc.) attached to the product (102). In one or more embodiments of the invention, the shopping module (106a) of the mobile POS application (106) accesses an optical character recognition (OCR) function of the mobile device (104) to obtain a numeric or alphanumeric value (e.g., text string) extracted from the picture. Accordingly, the product identifier (e.g., UPC, RFID, etc.) of the product (102) is returned to the shopping module (106a) of the mobile POS application (106).

In one or more embodiments of the invention, the product identifier (e.g., UPC, RFID, etc.) of the product (102) is entered by a user of the mobile device (104) and sent to the shopping module (106a) of the mobile POS application (106).

In one or more embodiments of the invention, the shopping module (106a) is configured to access the product database (121) based on the merchant store reference (114) obtained earlier. As described above in an example, the merchant store reference (114) is obtained by matching the geolocation data of the retail store (101) to the geolocation data (113) in the entry (112) of the location-merchant orchestration server (111). The merchant store reference (114) may then be used to determine a network address in the computer network (120) for accessing the corresponding product database (121) for the retail store (101). In another example, the merchant store reference (114) may be used to determine which portion of the product database (121) is associated with the corresponding retail store (101).

In one or more embodiments of the invention, the shopping module (106a) of the mobile POS application (106) is configured to retrieve product information (124) from the product database (121) by matching the product identifier scanned from the product (102) to the product identifier (123) in the record (122) of the product database (121). For example, the product information (124) may include a price of the product (102) in the retail store (101) and other information such as features, specifications, promotion discount etc. of the product (102). In one or more embodiments of the invention, the shopping module (106a) of the mobile POS application (106) is configured to retrieve product information (124) from the product database (121) by matching a picture of the product identifier taken using a built-in camera of the mobile device (104) to images stored in the product database (121).

In one or more embodiments of the invention, the shopping module (106a) is configured to display the product information (124) on the mobile device (104). In one or more embodiments of the invention, the shopping module (106a) is configured to display a virtual shopping cart (not shown) on the mobile device (104). In one or more embodiments of the invention, the shopping module (106a) of the mobile POS application (106) is configured to accept a shopping command from the user of the mobile device (104) to add the product (102) to the virtual shopping cart. Accordingly, the virtual shopping cart may include the quantity, description, and price of the products placed in the virtual shopping cart.

In one or more embodiments of the invention, the mobile POS application (106) includes transaction module (106b) for making purchases in the retail store (101) by interacting directly with the payment mechanism and product inventory of the retail store (101). Specifically, the transaction module (106b) is configured to: (i) send payment information of the user to the payment server (130) for executing a payment of the purchase; (ii) provide an electronic receipt (not shown) to the mobile device (104) based on the executed payment; (iii) notify the product database (121) to adjust inventory information reflecting the purchase; and (iv) interact with the exit station (103) for payment confirmation when exiting the retail store (101).

In one or more embodiments of the invention, the electronic receipt is generated by the payment server (130) and provided to the transaction module (106b) of the mobile POS application (106). The electronic receipt may be generated by the product database (121) in cooperation with the payment server (130) and provided to the transaction module (106b) of the mobile POS application (106). Alternatively, the electronic receipt (not shown) may be generated by the transaction module (106b) of the mobile POS application (106) directly. The electronic receipt may be stored in a memory or storage device of the mobile device (104) and made accessible using a browser built-in to the mobile device (104).

Figure 2A:
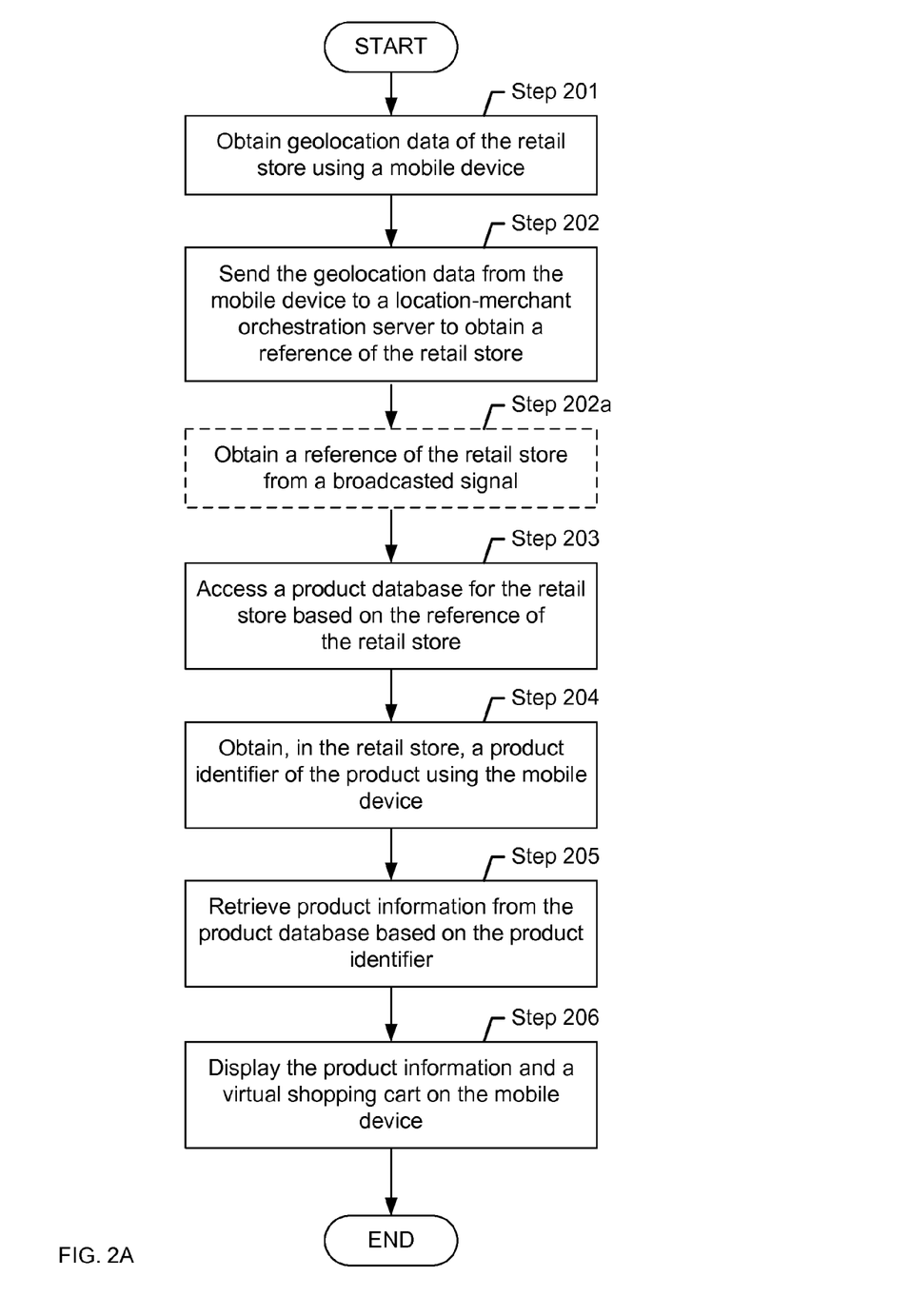
FIGS. 2A and 2B depict flowcharts in accordance with one or more embodiments of the invention.
Figure 2B:
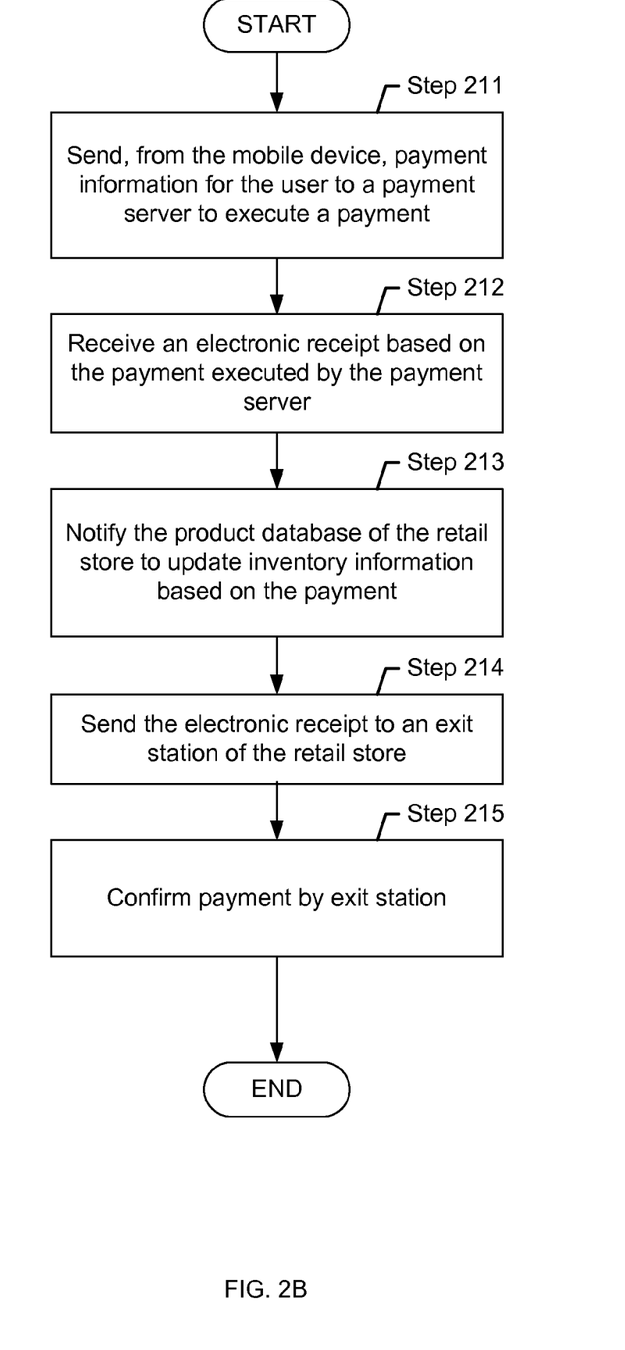

FIG. 2A and FIG. 2B depict flowcharts in accordance with one or more embodiments of the invention. One or more of the steps shown in FIG. 2A and FIG. 2B may be omitted, repeated, and/or performed in a different order. Accordingly, embodiments of the invention should not be considered limited to the specific arrangements of steps shown in FIG. 2A and FIG. 2B.

The processes depicted in FIG. 2A and FIG. 2B may be executed to purchase a product in a retail store using user-controlled POS services. Moreover, the process depicted in FIG. 2A may be executed by the shopping module (106a) of the system (100) while the process depicted in FIG. 2B may be implemented using the transaction module (106b) of the system (100). Further, various steps depicted in FIG. 2A and FIG. 2B may be executed using one or more secure wireless communication protocols over the computer network (120).

Initially, geolocation data of the retail store is obtained using a mobile device (Step 201). In one or more embodiments of the invention, the mobile device includes a geolocation identifier for obtaining the geolocation data representing a location of the mobile device. For example, the geolocation identifier may be a global positioning system (GPS) and the geolocation data may include global positioning (GPS) coordinates.

In one or more embodiments, the geolocation data of the retail store is obtained in response to the user activating the geolocation identifier on the mobile device when the user is within a certain range of the retail store. Accordingly, the obtained geolocation data represents a location of the retail store.

In one or more embodiments, the geolocation data of the retail store is obtained in response to the mobile device detecting a signal broadcasted by the retail store when the user carrying the mobile device is within certain range of the retail store. Accordingly, the obtained geolocation data represents a location of the retail store.

In Step 202, the geolocation data representing the location of the retail store is sent from the mobile device to a location-merchant orchestration server. In response to sending the geolocation data, a reference of the retail store (e.g., the merchant store reference (114)) is received by the mobile device from the location-merchant orchestration server. As described above, the location-merchant orchestration server may be part of a web service that maps a location (e.g. GPS coordinates) to a particular merchant or the merchant's retail store. As also described above, when a location is sent to the web service, the web service returns a reference identifying the corresponding merchant's product database. For example, the reference may be an IP network address for the product database. In another example, the reference may identify a portion of a product database corresponding to the retail store/merchant when the product database is shared by many merchants.

In one or more embodiments of the invention, Step 201 and Step 202 may be substituted with Step 202a, where the reference of the retail store is obtained from a signal broadcasted by the retail store. For example, the retail store may broadcast the signal within certain range (e.g., walking distance) of the retail store. In one or more embodiments, the broadcasted signal may be based on WiFi and/or Internet based push technology.

In Step 203, a product database for the retail store is accessed based on the reference received by the mobile device. As described above in reference to FIG. 1, the product database stores inventory and product information (e.g., pricing) for products sold by the merchant/retail store. As also discussed above, the records of the product database includes product identifiers (e.g. UPC, RFID, etc.) to identify specific products in the retail store. In one or more embodiments of the invention, the product database is maintained on a server of the merchant operating the retail store. Alternatively, the product database may be maintained on a server of the third party operator in accordance with the aforementioned business agreement.

In Step 204, a product identifier for a product is obtained by the mobile device. In one or more embodiments of the invention, the mobile device is equipped with a product scanner (e.g., an optical scanner, a radio frequency scanner, etc.) for obtaining the product identifier. In other words, the product identifier may be an UPC, RFID, etc. that can be obtained by scanning a product ID (e.g., barcode, RFID tag, etc.) attached to the product.

In Step 205, product information is retrieved from the product database based on the product identifier. In other words, the mobile device sends the product identifier to the product database. In response to sending the product identifier, the mobile device receives the corresponding product information (e.g., price of the product, description of the product, etc.) from the product database.

In Step 206, the product information is displayed on the mobile device. For example, the user may review the product information and decide to purchase the product. In one or more embodiments of the invention, the user may activate a command on the mobile device to add the product to a virtual shopping cart displayed on the mobile device. By adding the product, the virtual shopping cart will include the quantity, price, and other product information of the added product among other previously or subsequently added products.

Turning to FIG. 2B, payment information for the user is initially sent from the mobile device to a payment server in order to purchase the product (Step 211). The payment information may include, for example, the user's credit card number, an expiration date of the credit card, etc. The payment information may also include the total amount (i.e., base amount with tax) due to the retail store. In one or more embodiments of the invention, the payment information is sent in response to the user activating a check-out command on the mobile device. As described above in reference to FIG. 1 above, the payment service may be operated by the merchant or by a third party payment service provider.

In Step 212, an electronic receipt is received by the mobile device following a successful sales transaction. The electronic receipt includes all items purchased from the retail store. As also discussed above, the electronic receipt may include a unique identifier. The electronic receipt may be generated by the payment server, by the product database in cooperation with the payment server, and/or by a mobile application installed on the mobile device directly. Once generated, the electronic receipt may be sent to the mobile device to be stored in a memory or in a storage device of the mobile device. The electronic receipt may be accessible (i.e., available for viewing) using a built-in browser of the mobile device.

In Step 213, the product database for the retail store is notified regarding the successful sales transaction. Specifically, the product database is notified to decrement the quantity fields in the records corresponding to the purchased products. In other words, the product database is notified regarding the successful sales transaction in order to update inventory information for the retail store. In one or more embodiments of the invention, the product database for the retail store is notified by the payment server and/or the mobile device.

In Step 214, the electronic receipt is sent to one or more exit stations of the retail store. In one or more embodiments of the invention, the electronic receipt is sent to the exit station by the payment service when the payment is executed. Alternatively, the electronic receipt is sent to the exit station by the mobile device when the user exits the retail store carrying both the mobile device and the purchased product.

In Step 215, a signal is sent from the mobile device to the exit station in order to confirm payment. In one or more embodiments of the invention, the signal includes the electronic receipt and/or the unique identifier of the electronic receipt stored in the mobile device. The exit station may attempt to match the electronic receipt and/or the unique identifier received from the mobile device with one of the electronic receipts and/or the unique identifiers received from the payment server. Those skilled in the art, having the benefit of this detailed description, will appreciate that a successful match by the exit station confirms a successful sales transaction (i.e., confirmation of payment).

In one or more embodiments of the invention, instead of a signal to transmit the electronic receipt and/or the unique identifier from the mobile device to the exit station, the mobile device displays a barcode corresponding to the unique identifier. The barcode displayed on the mobile device may be scanned by a barcode scanner of the exit station in order to perform the match and confirm payment (discussed above).

In one or more embodiments of the invention, transmitting the electronic receipt from the mobile device to the exit station is sufficient to confirm payment (i.e., no matching is required).

Figure 3A:
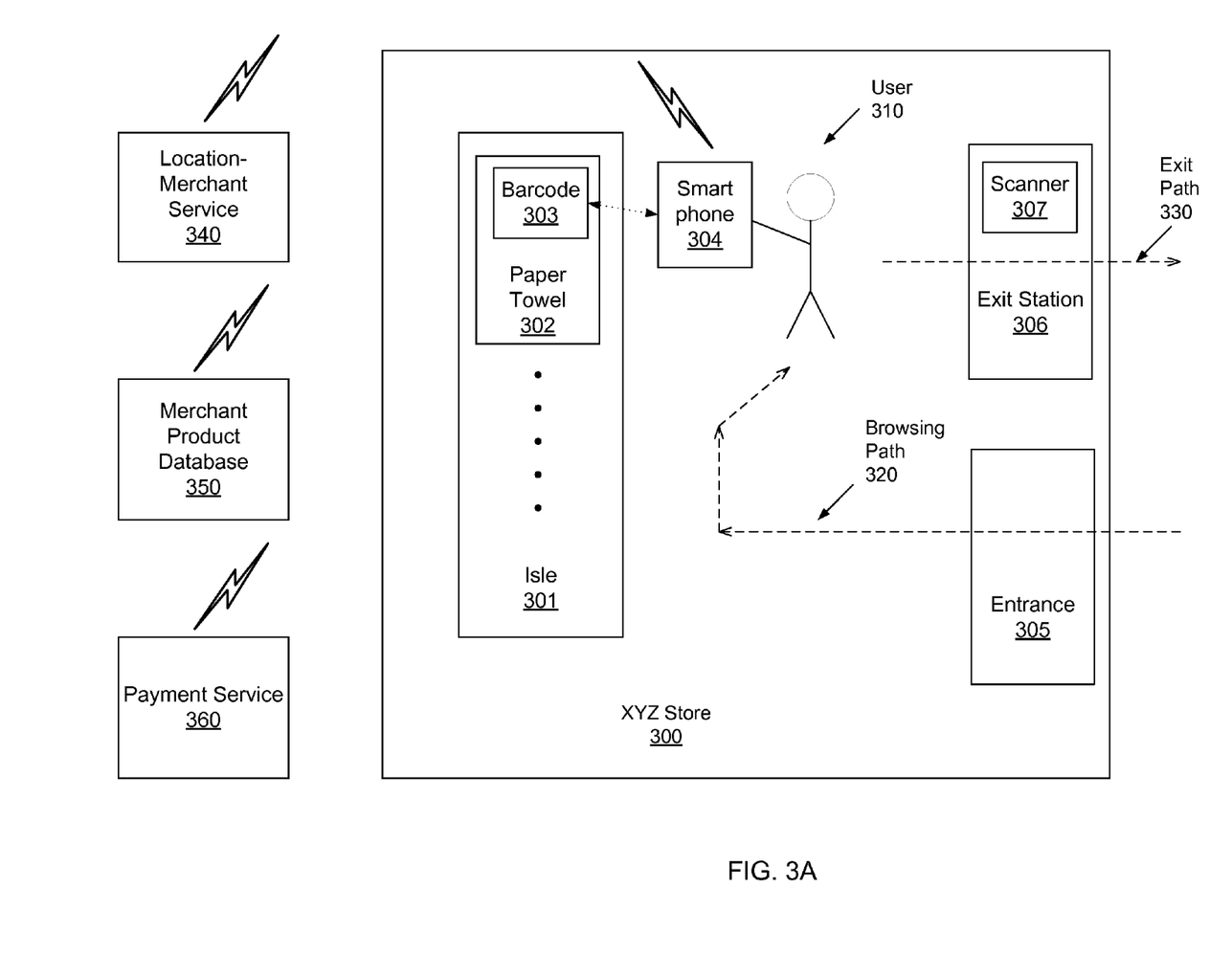
FIGS. 3A and 3B depict example screen shots of an application in accordance with one or more embodiments of the invention.

FIG. 3A depicts an example in accordance with one or more embodiments of the invention. FIG. 3A includes the XYZ store (300), which is a physical retail store featuring user-controlled POS services for shoppers such as the user (310). The XYZ store (300) sells paper towel (302). The user-controlled POS services are enabled by the location-merchant service (340), the merchant product database (350), the payment service (360), and a mobile POS application (not shown) installed on a smart phone (304) of the user (310). The smart phone (304) is equipped with a GPS sensor and a camera.

The location-merchant service (340) is a web service hosted on a location-merchant orchestration server (e.g., location-merchant orchestration server (111) described above in reference to FIG. 1). In response to receiving location information (e.g., GPS coordinates) from the mobile POS application, the location-merchant service (340) maps the location information to the XYZ Store (300), and returns the IP address of the merchant product database (350) corresponding to the XYZ Store (300).

The merchant product database (350) is a database containing product information such as price and product description. The merchant product database (350) can be updated by the merchant operating the XYZ store (300) allowing customers (e.g., the user (310)) to instantly have the most up-to-date listings of products (e.g., paper towel (302)). The merchant product database (350) may be essentially the same as the product database (121), discussed above in reference to FIG. 1.

The mobile POS application installed on the smart phone (304) is essentially the same as the mobile POS application (106) discussed above in reference to FIG. 1. The mobile POS application connects to the location-merchant service (340) in order to retrieve the IP address of the merchant product database (350). Using this IP address, the mobile POS application can request pricing information for the paper towel (302) from the merchant product database (350). Specifically, the user (310) scans (e.g., using the built-in camera of the smart phone (304)) the barcode (303) attached to the paper towel (302), and submits this product identifier to the merchant product database (350) in order to receive product information for the paper towel (302). Further, the mobile POS application has the ability to submit requests for processing payments to the payment service (360) by making web service calls. The payment service (360) may be essentially the same as the payment server (130) discussed above in reference to FIG. 1.

By using the location-merchant service (340), the merchant product database (350), and the payment service (360), the smart phone (304) of the user (310) can perform all shopping and checkout activities within the XYZ Store (300).

As shown in FIG. 3A, the user (310) with the smart phone (304) walks into the XYZ store and begins to shop as indicated by the browsing path (320). When entering the XYZ store (300) through the entrance (305), the user (310) turns on the mobile POS application, which automatically obtains GPS coordinates using the GPS sensor of the smart phone (304). Alternatively, the mobile POS application may be running in the background and wake up to obtain the GPS coordinates automatically upon receiving a signal broadcasted by the XYZ store near the entrance (305). The mobile POS application matches the current location of the smart phone to that of the merchant operating the XYZ store (300) using the location-merchant service (340), and connects to that merchant's product database (350).

As the user (310) shops along the isle (301), the user (310) scans the barcode (303) of the paper towel (302) in the isle (301) to retrieve up-to-date product information from the merchant product database (350). For example, the mobile POS application may be equipped with the functionality to recognize the barcode (303) from the image captured using the built-in camera of the smart phone (304). If the user (310) decides to purchase the paper towel (302), the item is added to a virtual shopping cart displayed on the smart phone (304) by the mobile POS application.

When the user (310) wishes to checkout, payment information may be entered into the smart phone (304) and submitted to the merchant through the payment service (360). Alternatively, the payment information may be previously stored in the smart phone (304) or the payment service (360) and retrieved for payment. An electronic receipt may then be generated and provided to the smart phone (304) when the payment is executed.

The electronic receipt may be sent to the exit station (306) from the payment service (360) when the payment service (360) executes the payment. When the user approaches the exit station (306) along the exit path (330), the electronic receipt stored in the smart phone (304) may be transmitted to the exit station. Alternatively, a barcode corresponding to the electronic receipt may be displayed on the smart phone (304) and scanned using the scanner (307) of the exit station (306). The exit station (306) matches the electronic receipt obtained from the mobile device with an electronic receipt received from the payment service (360). A match confirms payment by the user (310) for the paper towel (302).

Figure 3B:
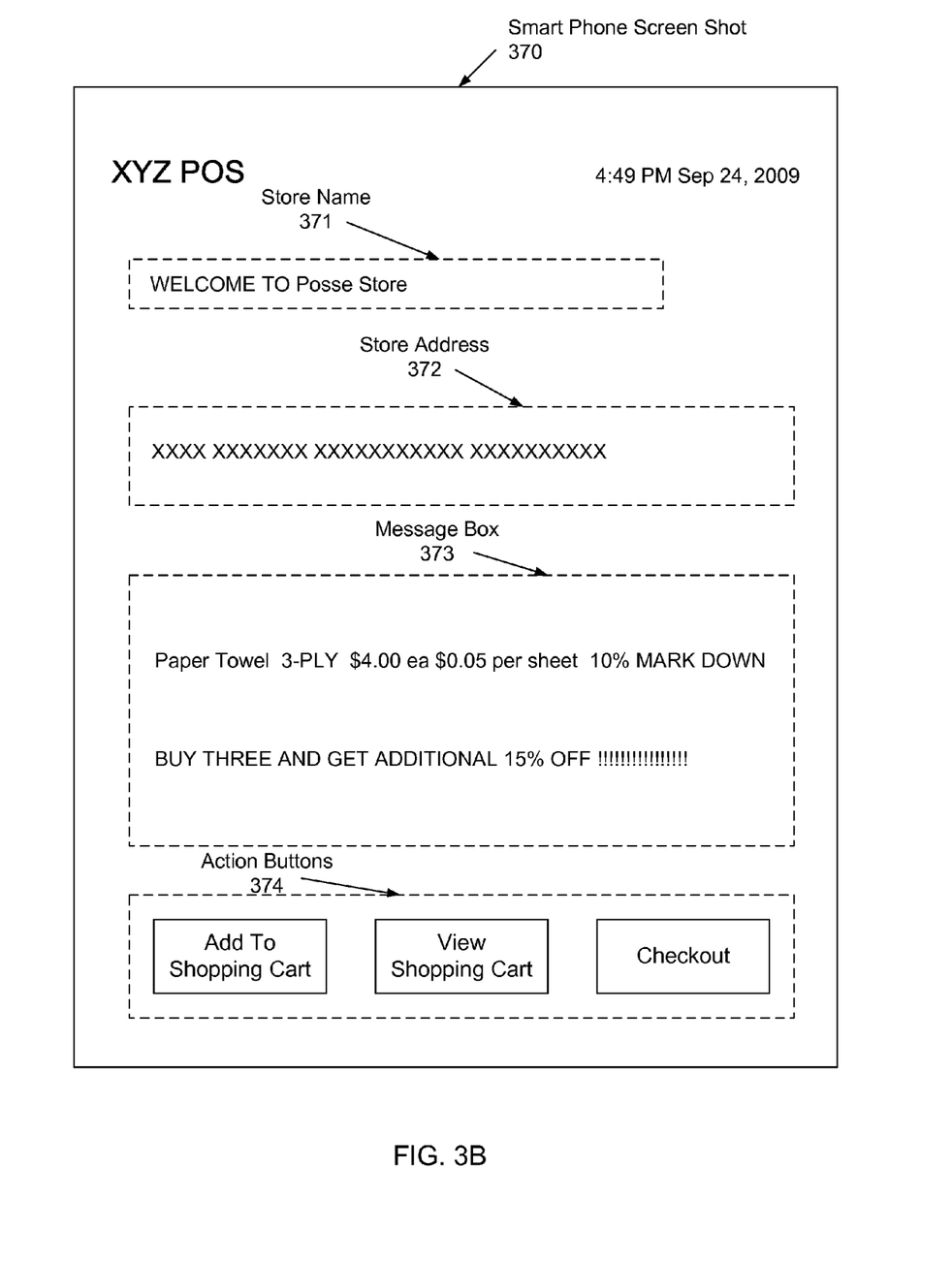

FIG. 3B depicts a smart phone screen shot (370) of the mobile POS application displayed on the smart phone (304). The smart phone screen shot (370) includes the store name (371) and the store address (372) retrieved from the location-merchant service (340) using the GPS coordinates of the XYZ store (300). The store name (371) and the store address (372) may be viewed by the user (310) to confirm that correct information is being used for the user-controlled POS services. As the user scans the barcode (303), the product information retrieved from the merchant product database (350) is displayed in the message box (373). The product information may include item description "Paper Towel", specification "3-PLY", pricing information "$4.00 ea $0.05 per sheet", promotion discount information "10% MARK DOWN" and "BUY THREE AND GET ADDITIONAL 15% OFF!!!!!!!!!!". The smart phone screen shot (370) also includes action buttons (374), which can be used by the user (310) to add the displayed item to the virtual shopping cart, to switch the message box (373) for displaying the virtual shopping cart, and to initiate the checkout process of the virtual shopping cart.

In one or more embodiments of the invention, the user-controlled POS services depicted in the FIG. 3A and FIG. 3B represents a fundamentally new approach in the point-of-sale experience for the user (310). Specifically, the system and method provide self-checkout functionality on the smart phone (304) and the installed mobile POS application owned by and familiar to the user (310). The system and method also allow the user (310) to utilize the smart phone (304) as a mobile self-checkout system at multiple merchants. In other words, the user-controlled POS services depicted in the FIGS. 3A and 3B allow the user (310) to utilize a single software application on a single physical mobile device to complete checkout and payment services at multiple retail stores operated by multiple merchants.

Figure 4:
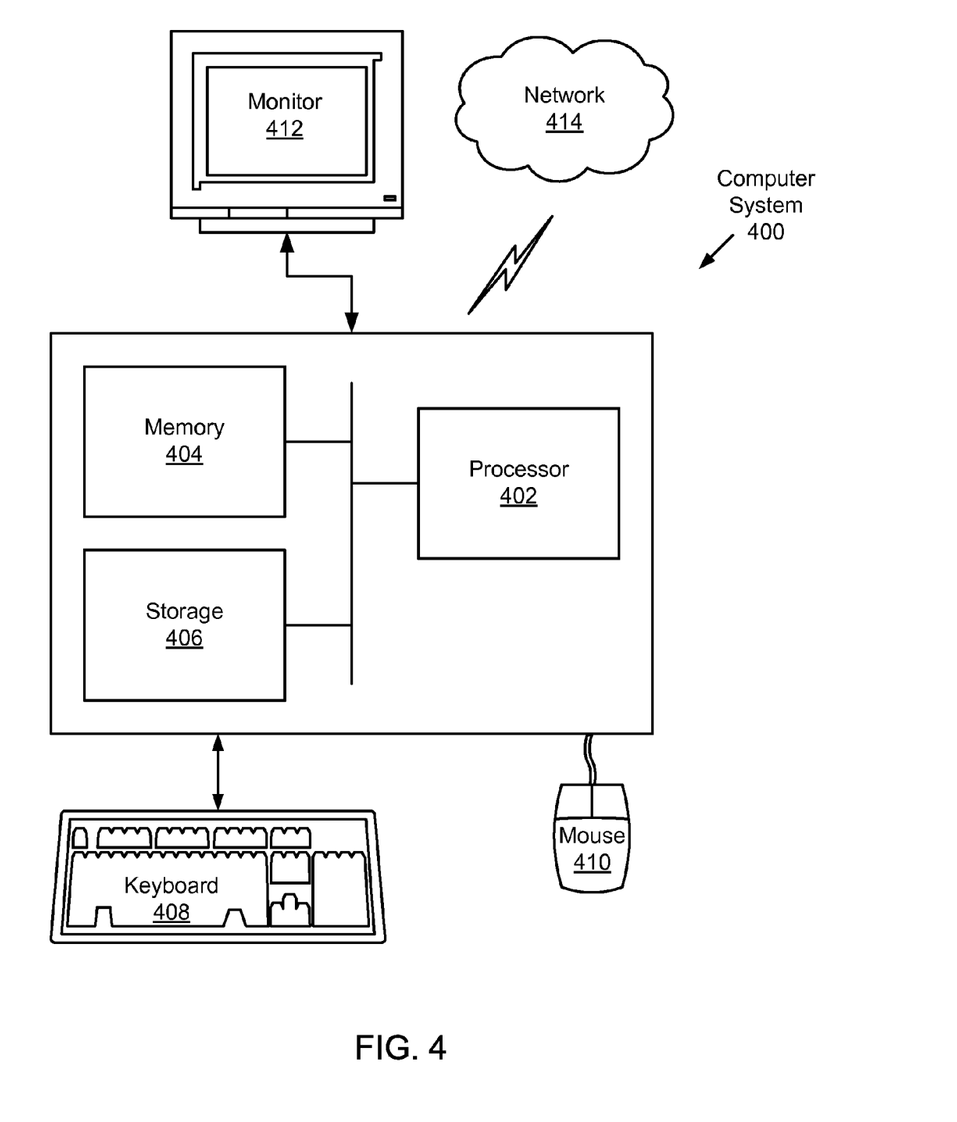
FIG. 4 depicts a computer system in accordance with one or more embodiments of the invention.

Embodiments of the invention may be implemented on virtually any type of computer regardless of the platform being used. For example, as shown in FIG. 4, a computer system (400) includes one or more processor(s) (402), associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer system (400) may also include input means, such as a keyboard (408), a mouse (410), or a microphone (not shown). Further, the computer system (400) may include output means, such as a monitor ((412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network)) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., computing device, mentor, authentication module, attendance module, query engine, data repository, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a tangible, non-transitory, computer readable medium such as a compact disc (CD), a diskette, a tape, a punch card, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to purchase a product by a user in a retail store, comprising:

obtaining, in response to a signal broadcast by the retail store in proximity to an entrance of the retail store, a reference of the retail store using a mobile device of the user by:
receiving the signal at the mobile device when brought within a pre-determined range of the entrance as the user enters the retail store instructing the mobile device to obtain geolocation data of the retail store;
obtaining, using a global positioning sensor of the mobile device in response to receiving the signal from the retail store, geolocation data of the retail store; and
sending, in response to receiving the signal from the retail store, the geolocation data from the mobile device to a location-merchant orchestration server separate from the mobile device and the retail store to obtain the reference of the retail store;
accessing a product database for the retail store based on the reference of the retail store;

obtaining, in the retail store, a product identifier of the product using the mobile device;
retrieving product information from the product database based on the product identifier;
displaying the product information on the mobile device;
sending, from the mobile device, payment information of the user to a payment server to execute a payment for purchasing the product;
receiving an electronic receipt based on the payment executed by the payment server; and
sending a signal from the mobile device to the exit station to activate the electronic receipt for inspecting the product using at least one selected from a group consisting of an optical scanner and a radio frequency scanner of the exit station.

2. The method of claim 1, further comprising: displaying a virtual shopping cart on the mobile device, wherein the product information is displayed in the virtual shopping cart and comprises a description and a price of the product.

3. The method of claim 1, wherein the product identifier is obtained using at least one selected from a group consisting of an optical scanner, a radio frequency scanner, and a camera of the mobile device.

4. The method of claim 1, wherein the mobile device is a mobile phone comprising a geolocation identifier for obtaining the geolocation data.

5. The method of claim 1, further comprising: receiving a command at the mobile device from the user, wherein the mobile device obtains and sends the geolocation data to obtain the reference of the retail store further responsive to receiving the command.

6. The method of claim 1, further comprising: notifying the product database for the retail store to update inventory information based on the payment executed by the payment server.

7. The method of claim 1, further comprising: sending the electronic receipt to an exit station of the retail store, wherein the electronic receipt is used by the exit station to confirm the payment.

8. A system for purchasing a product by a user in a retail store, comprising:
a product database accessible based on a reference of the retail store, configured to:
store product information of the product indexed by a product identifier of the product;
and provide the product information based on the product identifier of the product; and
a mobile device of the user comprising:
a product scanner configured to obtain, in the retail store, the product identifier of the product; and
a mobile point-of-sale (POS) application configured to:
obtain, in response to a signal broadcasted by the retail store in proximity to an entrance of the retail store, the reference of the retail store by:
receiving the signal at the mobile device when brought within a pre-determined range of the entrance as the user enters from the retail store instructing the mobile device to obtain geolocation data of the retail store;
obtaining, using a global positioning sensor of the mobile device in response to receiving the signal from the retail store, geolocation data of the retail store; and
sending, in response to receiving the signal from the retail store, the geolocation data from the mobile device to a location-merchant orchestration server separate from the mobile device and the retail store to obtain the reference of the retail store;
cause the product scanner to obtain the product identifier of the product;
access the product database based on the reference of the retail store;
retrieve product information from the product database based on the product identifier;
display the product information;
a payment server configured to:
receive payment information of the user from the mobile device to execute a payment for purchasing the product, wherein the mobile POS application is further configured to send the payment information from the mobile device to the payment server; and cause an electronic receipt to be provided to the mobile device based on the payment; and
an exit station of the retail store configured to:
wherein the mobile POS application is further configured to: activate, by sending a signal to the exit station, the received electronic receipt at the exit station for confirming the payment; receive the electronic receipt; and confirm the payment based on the received electronic receipt, wherein the exit station comprises at least one selected from a group consisting of an optical scanner and a radio frequency scanner for inspecting the product against the activated electronic receipt.

9. The system of claim 8, further comprising:
the location-merchant orchestration server configured to:
store the reference of the retail store indexed by geolocation data of the retail store;
and provide the reference of the retail store based on the geolocation data of the retail store, wherein the mobile device of the user further comprises:
a geolocation identifier configured to obtain the geolocation data of the retail store, and wherein the mobile POS application is further configured to: cause the geolocation identifier to obtain the geolocation data of the retail store.

10. The system of claim 8, further comprising: a transceiver configured to receive a signal from the retail store, wherein the mobile POS application is further configured to: retrieve the reference of the retail store from the signal.

11. The system of claim 8, the mobile POS application is further configured to display a virtual shopping cart, wherein the product information is displayed in the virtual shopping cart and comprises a description and a price of the product.

12. The system of claim 8, wherein the product scanner comprises at least one selected from a group consisting of an optical scanner, a radio frequency scanner, a camera for obtaining the product identifier of the product.

13. The system of claim 8, wherein the mobile device is a mobile phone.

14. The system of claim 8, wherein the mobile POS application sends the geolocation data to obtain the reference of the retail store further responsive to receiving a command from the user.

15. The system of claim 8, further comprising: a transceiver configured to receive the signal from the retail store.

16. The system of claim 8, wherein the electronic receipt is generated by at least one selected from a group consisting of the payment server, the product database, and the mobile POS application.

17. The system of claim 8, wherein at least one selected from a group consisting of the mobile POS application and the payment server is further configured to: notify the product database to update inventory information based on the payment.

18. A non-transitory computer readable medium, embodying instructions executable by the computer to perform method steps to purchase a product by a user in a retail store, the instructions comprising functionality for:

obtaining, in response to a signal broadcasted the retail store in proximity to an entrance of the retail store, a reference of the retail store using a mobile device of the user by:

receiving the signal at the mobile device when brought within a pre-determined range of the entrance as the user enters the retail store;

obtaining, using a global positioning sensor of the mobile device in response to receiving the signal from the retail store, geolocation data of the retail store; and sending, in response to receiving the signal from the retail store, the geolocation data from the mobile device to a location-merchant orchestration server separate from the mobile device and the retail store to obtain the reference of the retail store;

accessing a product database for the retail store based on the reference of the retail store;

obtaining, in the retail store, a product identifier of the product using the mobile device;

retrieving product information from the product database based on the product identifier;

displaying the product information on the mobile device;

sending, from the mobile device, payment information of the user to a payment server to execute a payment for purchasing the product;

receiving an electronic receipt based on the payment executed by the payment server; and sending a signal from the mobile device to the exit station to activate the electronic receipt for inspecting the product using at least one selected from a group consisting of an optical scanner and a radio frequency scanner of the exit station.

19. The non-transitory computer readable medium of claim 18, the instructions further comprising functionality for: displaying a virtual shopping cart on the mobile device, wherein the product information is displayed in the virtual shopping cart and comprises a description and a price of the product.

20. The non-transitory computer readable medium of claim 18, wherein the product identifier is obtained using at least one selected from a group consisting of an optical scanner a radio frequency scanner, and a camera of the mobile device.

21. The non-transitory computer readable medium of claim 18, wherein the mobile device is a mobile phone comprising a geolocation identifier for obtaining the geolocation data.

22. The non-transitory computer readable medium of claim 18, the instructions further comprising functionality for: receiving a command at the mobile device from the user, wherein the mobile device obtains and sends the geolocation data to obtain the reference of the retail store further responsive to receiving the command.

23. The non-transitory computer readable medium of claim 18, the instructions further comprising functionality for: notifying the product database for the retail store to update inventory information based on the payment executed by the payment server.

24. The non-transitory computer readable medium of claim 18, the instructions further comprising functionality for: sending the electronic receipt to an exit station of the retail store, wherein the electronic receipt is used by the exit station to confirm the payment.

* * * * *